United States Patent
Jin

(10) Patent No.: US 11,669,249 B2
(45) Date of Patent: Jun. 6, 2023

(54) DATA PROCESSING SYSTEM PERFORMING NEURAL NETWORK OPERATIONS AND OPERATING METHOD THEREOF

(71) Applicant: SK hynix Inc., Icheon (KR)

(72) Inventor: Young Jae Jin, Icheon (KR)

(73) Assignee: SK hynix Inc., Icheon (KR)

( * ) Notice: Subject to any disclaimer, the term of this patent is extended or adjusted under 35 U.S.C. 154(b) by 416 days.

(21) Appl. No.: 16/911,086

(22) Filed: Jun. 24, 2020

(65) Prior Publication Data
US 2021/0181951 A1 Jun. 17, 2021

(30) Foreign Application Priority Data
Dec. 17, 2019 (KR) .................... 10-2019-0168892

(51) Int. Cl.
*G06F 3/06* (2006.01)
*G06N 3/063* (2023.01)
*G06N 3/045* (2023.01)

(52) U.S. Cl.
CPC .......... *G06F 3/0611* (2013.01); *G06F 3/0638* (2013.01); *G06F 3/0659* (2013.01); *G06F 3/0673* (2013.01); *G06N 3/045* (2023.01); *G06N 3/063* (2013.01)

(58) Field of Classification Search
CPC ... G06T 1/20; G06T 1/60; G06N 3/02; G06N 3/04; G06N 3/0454; G06N 3/063; G06N 3/08; G06F 3/0611; G06F 3/0626; G06F 3/0638; G06F 3/0658; G06F 3/0659; G06F 3/0673; G06F 3/0679
USPC ......... 345/531, 564, 566; 706/15, 16, 25, 27
See application file for complete search history.

(56) References Cited

U.S. PATENT DOCUMENTS

| 2018/0046916 | A1* | 2/2018 | Dally ..................... G06N 3/063 |
| 2019/0087716 | A1* | 3/2019 | Du ............................ G06F 7/57 |
| 2020/0293867 | A1* | 9/2020 | Shao ....................... G06F 17/16 |

FOREIGN PATENT DOCUMENTS

KR 101803409 B1 12/2017

* cited by examiner

*Primary Examiner* — Jacinta M Crawford

(57) ABSTRACT

A data processing system, which performs a neural network operation in response to a request from a host, comprising: a controller configured to receive control information and the input data from the host and to generate the output data by performing an operation on the input data and the weight, the control information including a scheme for storing a parameter including input data, output data, and a weight and a scheme for reusing the weight; and a memory device configured to store the weight according to control of the controller as the weight is transmitted from the host, wherein the controller includes an address converter configured to map a physical address provided from the host to a memory address based on the parameter storing scheme and the weight reusing scheme so that a bandwidth of a reading operation of the weight is maximized.

19 Claims, 12 Drawing Sheets

| WS | PS | SEL |
|---|---|---|
| H | Don't care | L |
| L | H | L |
| L | L | H |

| ACCESS ORDER | IID | OID |
|---|---|---|
| 1 | 0 | 0 |
| 2 | 1 | 0 |
| 3 | 2 | 0 |
| 4 | 3 | 0 |
| 5 | 4 | 0 |
| 6 | 0 | 1 |
| 7 | 1 | 1 |
| 8 | 2 | 1 |
| 9 | 3 | 1 |
| 10 | 4 | 1 |
| ⋮ | ⋮ | ⋮ |

(a)

| ACCESS ORDER | FIRST MA | SECOND MA |
|---|---|---|
| 1 | 0 | 0 |
| 2 | 0 | 1 |
| 3 | 0 | 2 |
| 4 | 0 | 3 |
| 5 | 0 | 4 |
| 6 | 1 | 0 |
| 7 | 1 | 1 |
| 8 | 1 | 2 |
| 9 | 1 | 3 |
| 10 | 1 | 4 |
| ⋮ | ⋮ | ⋮ |

(b)

DATA PROCESSING SYSTEM PERFORMING NEURAL NETWORK OPERATIONS AND OPERATING METHOD THEREOF

CROSS-REFERENCES TO RELATED APPLICATION

The present application claims priority under 35 U.S.C. § 119(a) to Korean application number 10-2019-0168892, filed on Dec. 17, 2019, in the Korean Intellectual Property Office, which is incorporated herein by reference in its entirety.

BACKGROUND

1. Technical Field

Various embodiments may generally relate to a computing device, and more particularly, to a data processing system and an operating method thereof.

2. Related Art

As interest in and the importance of artificial intelligence applications and big data analysis increases, demand for computing systems capable of efficiently processing large amounts of data has increased.

While traditional computing systems have focused on processor-centric computing, the latest computing systems have evolved into data-centric computing systems or memory-centric computing systems capable of parallel processing massive data at high speed. As a result, computing performance has been maximized due to reduction in a data bottleneck between processors and memories.

Because the performance and speed of the computing devices depend on data write rates and data read rates of memories, there is a need for improved high-speed input and output of massive data.

SUMMARY

In an embodiment of the present disclosure, a data processing system, which performs a neural network operation in response to a request from a host, comprising: a controller configured to receive control information and the input data from the host and to generate the output data by performing an operation on the input data and the weight, the control information including a scheme for storing a parameter including input data, output data, and a weight and a scheme for reusing the weight; and a memory device configured to store the weight according to control of the controller as the weight is transmitted from the host, wherein the controller includes an address converter configured to map a physical address provided from the host to a memory address based on the parameter storing scheme and the weight reusing scheme so that a bandwidth of a reading operation of the weight is maximized.

In an embodiment of the present disclosure, a data processing system, which performs a neural network operation in response to a request of a host, comprising: a controller configured to generate output data by performing an operation on input data and a weight transmitted from the host; and a memory device configured to store the weight transmitted from the host according to control of the controller, wherein the controller includes an address converter configured to receive a physical address, the physical address including an input node identifier (ID) indicating the input data operated on with the weight and an output node ID indicating the output data that is a result of the operation of the weight and the input data, from the host as a weight storage address and map the physical address to a memory address according to a change pattern of input node IDs and output node IDs of weights read for the operation.

In an embodiment of the present disclosure, an operating method of a data processing system which includes a controller and a memory device configured to store data according to control of the controller and that performs a neutral network operation in response to a request of a host, the method comprising: mapping, by the controller as control information, input data, and a weight are received from the host, the control information including a scheme for storing a parameter including input data, output data, and a weight and a scheme for reusing the weight, a physical address provided from the host to a memory address based on the parameter storing scheme and the weight reusing scheme so that a bandwidth of a reading operation of the weight is maximized; storing, by the memory device, the weight in the memory address; and generating, by the controller, the output data by performing an operation on the input data and the weight.

These and other features, aspects, and embodiments are described in more detail below.

BRIEF DESCRIPTION OF THE DRAWINGS

The above and other aspects, features and advantages of the subject matter of the present disclosure will be more clearly understood from the following detailed description taken in conjunction with the accompanying drawings, in which:

FIG. 10 illustrates a select signal generating method according to an embodiment of the present disclosure; and FIGS. 11, 12, and 13 illustrate address mapping concepts according to embodiments of the present disclosure.

DETAILED DESCRIPTION

Various embodiments of the present teachings are described in detail with reference to the accompanying drawings. The drawings are schematic illustrations of various embodiments (and intermediate structures). As such, variations from the configurations and shapes of the illustrations as a result, for example, of manufacturing techniques and/or tolerances, are to be expected. Thus, the described embodiments should not be construed as being limited to the particular configurations and shapes illustrated herein but may include deviations in configurations and shapes which do not depart from the scope of the present teachings as defined in the appended claims.

The present teachings are described herein with reference to cross-section and/or plan illustrations of idealized embodiments of the present teachings. However, embodiments of the present teachings should not be construed as limiting the present teachings. Although a few embodiments of the present teachings are shown and described, it will be appreciated by those of ordinary skill in the art that changes may be made in these embodiments without departing from the principles and gist of the present teachings.

Figure 1:
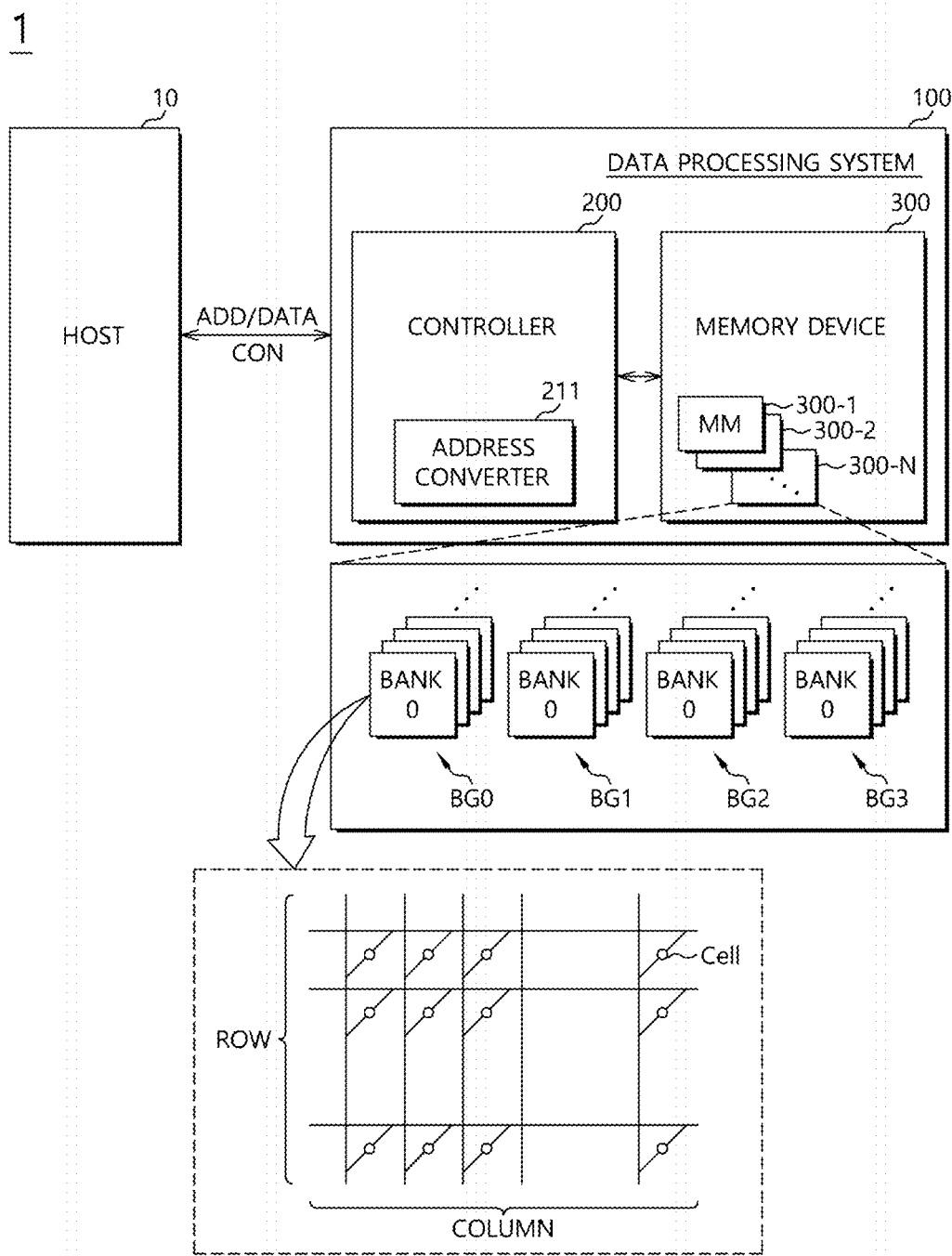
FIG. 1 illustrates an electronic device including a data processing system according to an embodiment of the present disclosure.

FIG. 1 illustrates a configuration of an electronic device 1 including a data processing system 100 according to an embodiment.

The electronic device 1 may include a host 10 and the data processing system 100.

The electronic device 1 may be various electronic devices, for example, a personal computer, a server computer, a mobile computing device, an electronic control device for a vehicle, etc.

The electronic device 1 may include a high-performance computing (HPC) device which performs an operation in a cooperative manner using a super computer or a computer cluster, or an array of networked information processing devices or servers which process data individually.

The host 10 may provide various services to the user through a user interface. To provide the various services, the host 10 may transmit control information CON and an address ADD related to data processing to the data processing system 100 and if necessary, the host 10 may transmit data DATA to the data processing system 100 and receive a data processing result from the data processing system 100.

The data processing system 100 may perform an operation corresponding to a request of the host 10 and if necessary, the data processing system 100 may transmit data to the host 10.

The host 10 may request data input and output to the data processing system 100 or request the data processing system 100 to offload and process applications accompanying the data input and output. Here, the term "offload" may mean that the operation, which would otherwise be processed in the host 10, is delegated to another device, for example, the data processing system 100 from the host 10.

The host 10 may transmit the control information CON and an initial parameter to the data processing system 100 to request the offload processing of a specific application. When the offload processing of a neural network application is requested, the initial parameter may include the input data and an initial weight and the host 10 may transmit the control information CON and the input data to a controller 200 and transmit and store the initial weight to and in a memory device 300. The control information CON may include a kind of an application to be executed in the data processing system 100, a program code storage address of the application, an initial parameter storage address, and a parameter storing scheme.

The data processing system 100 may include the controller 200 and the memory device 300, and may process the request of the host in response to the control information CON and the initial parameter.

The memory device 300 may store data or output stored data under the control of the controller 200. The memory device 300 may include a plurality of memory modules (MMs) 300-1 to 300-N and may be configured to be accessed in page (e.g., one or more bytes) units. For example, the controller 200 may access the memory device 300 in page units.

In embodiments, each of the memory modules 300-1 to 300-N may be structured as a hierarchy of divisions. In an embodiment, each of the memory modules 300-1 to 300-N may include a first division into a plurality of bank groups BG0 to BG3. Each of the plurality of bank groups BG0 to BG3 may include a second division into a respective plurality of banks BANK. Each of the plurality of banks BANK may include a plurality of memory cells Cell coupled between a plurality of row lines (or word lines) ROW and a plurality of column lines (or bit lines or strings) COLUMN. In an embodiment, memory cells coupled to one row line (or word line) may form one page, and accordingly each of the banks may be considered to include a third division into a respective plurality of rows, and each row may be considered to include a fourth division into a respective plurality of columns. These divisions may hereinafter be referred to as memory divisions.

The memory modules 300-1 to 300-N may include volatile memory modules and may further include nonvolatile memory modules.

The volatile memory module may include, for example, a dynamic random access memory (DRAM) and/or a static random access memory (SRAM). The nonvolatile memory module may include, for example, at least one among an electrically erasable and programmable read only memory (EEPROM), a NAND flash memory, a NOR flash memory, a phase-change random access memory (PRAM), a resistive RAM (ReRAM), a ferroelectric RAM (FRAM), and a spin torque transfer magnetic RAM (STT-MRAM).

In an embodiment, each of the memory modules 300-1 to 300-N may be a single in-line memory module (SIMM) or a dual in-line memory module (DIMM) which includes a plurality of memory chips mounted on a module board, or a high-bandwidth memory (HBM) module. The HMB module may include a plurality of HMBs and at least one hardware accelerator mounted on an interposer. In an embodiment, when the memory modules 300-1 to 300-N are the SIMMs or DIMMs, the memory modules 300-1 to 300-N may be configured in a form that the controller 200 is included on the module board and when the memory modules 300-1 to 300-N are the HBM modules, the memory modules 300-1 to 300-N may be configured in a form that the controller 200 is included on a base die mounted on the interposer.

While the controller 200 may load a program code read from a memory region corresponding to the application program code storage address and the input data read from an input data storage region in an internal memory, the controller 200 may read an initial weight from the memory device 300 to be loaded to the internal memory, and execute the program code, for example, perform an operation, according to the control information CON provided from the host 10. The application program code may be stored in a memory of the host 10 or a nonvolatile memory module of the memory device 300. For example, data generated according to the execution of the application program code may be stored in the memory device 300. In another example, the data generated by the execution of the application program code may be temporarily stored in a volatile memory module and then, if necessary, the data temporarily stored in the volatile memory module may be stored in the nonvolatile memory module.

In an embodiment, the host 10 may request the data processing system 100 to offload and process a machine learning application or an artificial intelligence application, for example, a neural network operation. Data used during the neural network operation processing, for example, the weights may be divided according to layers included in a neural network model and stored in the memory device 300.

In an embodiment, the weights used in an operation of a specific layer may be stored in the same row address. An algorithm for processing the neural network application may be configured of a plurality of layers and an accessing order to the memory device 300 to read the weights used in each layer may be different from a storing order of the weights in the memory device 300 and may be changed according to an operation scheme of the neural network model and a structure of the controller 200.

For example, a case where a write order of the weight is different from a read order of the weight may be present and the case may affect the read latency.

In an embodiment of the present technology, when a job requested to be processed by the host 10 includes neural network operation processing, the controller 200 may store the weight by mapping a physical address PA provided from the host 10 to a memory address MA based on the weight reusing scheme of the corresponding neural network algorithm and the parameter storing scheme of the controller 200 in such a manner that a bandwidth of the weight read operation is maximized. Here, the parameter to be stored may include the weight, the input data, and the output data.

In an embodiment, the weight reusing scheme may be either a weight sharing scheme or a weight non-sharing scheme. The weight sharing scheme refers to a scheme which generates the output data by applying the same weight set to a plurality of pieces of input data. For example, an operation which generates a plurality of pieces of output data by applying the same weight filter to the plurality of pieces of input data in an operation process of a convolution layer of a convolutional neural network (CNN) may be referred to as the weight sharing scheme of operation. The weight non-sharing scheme refers to a scheme which generates the output data by applying different weight sets to the plurality of pieces of input data. For example, an operation which generates the plurality of pieces of output data by applying different weight matrixes to the plurality of pieces of input data in a fully connected neural network of the CNN or a fully connected layer of the CNN may be referred to as the weight non-sharing scheme of operation.

The parameter storing scheme may be a weight stationary scheme, an input stationary scheme, or an output stationary scheme. The weight stationary scheme refers to a scheme in which the weight remains stationary in a cache memory of the controller 200 during one cycle of neural network operation process. The input stationary scheme refers to a scheme in which the input data remains stationary during one cycle of neural network operation process. The output stationary scheme refers to a scheme in which the output data remains stationary during one cycle of neural network operation process.

Detailed examples of weight reusing schemes and parameter storing schemes will be described below.

In another aspect, the controller 200 may be configured to receive a physical address, which includes the input node ID indicating the input data operated on with the weight and the output node ID indicating the output data as an operation result, as the weight storage address and map the physical address to a memory address according to a change pattern of input and output node IDs of weights simultaneously read for the operation. That is, because a weight indicates the effect that an input node has on an output node, a weight may be uniquely identified by its corresponding input node ID (IID) and output node ID (OID), and a unique physical address of the node may therefore be determined using the IID and OID. The change pattern of the input and output node IDs may be determined based on the weight reusing scheme of the neural network algorithm and the parameter (weight, input data, and output data) storing scheme of the controller 200.

The controller 200 according to an embodiment may receive a plurality of pieces of input data having input node IDs and a plurality of weight sets each including a plurality of weights, and may generate a plurality of pieces of output data having output node IDs by performing an operation on the plurality of pieces of input data and the weight sets. The controller 200 may use the input node ID and the output node ID associated with each weight set in the operation to determine a physical address of the weight set, and may store the weight set in a memory region corresponding to a memory address by mapping the physical address to the memory address in such a manner that the number of weights simultaneously read is maximized.

In an embodiment, the physical addresses may include a first physical address corresponding to the input node ID and a second physical address corresponding to the output node ID. The memory address may include a first memory address corresponding to a memory division having a first latency in accessing with changing of an address (such as, for example, a row) and a second memory address corresponding to a memory division having a second latency shorter than the first latency in accessing with changing of an address (such as, for example, a bank group). A physical address corresponding to an ID having the higher change frequency of the physical addresses of the plurality of weight sets used in the operation may be mapped to the first memory address.

The input data and the weight set provided from the host 10 and the output data generated as the operation result of the controller 200 may constitute the operation parameter and the change frequency may be determined according to reuse/non-reuse of the weight set used in the operation and the kind of the operation parameter which is stationary in the controller 200 during the operation.

As described above, the weight may be stored in such a manner that the read bandwidth of the weights, which are simultaneously (or within a limited period of time) read for the operation, is maximized and thus the data read speed may be improved.

Figure 2:
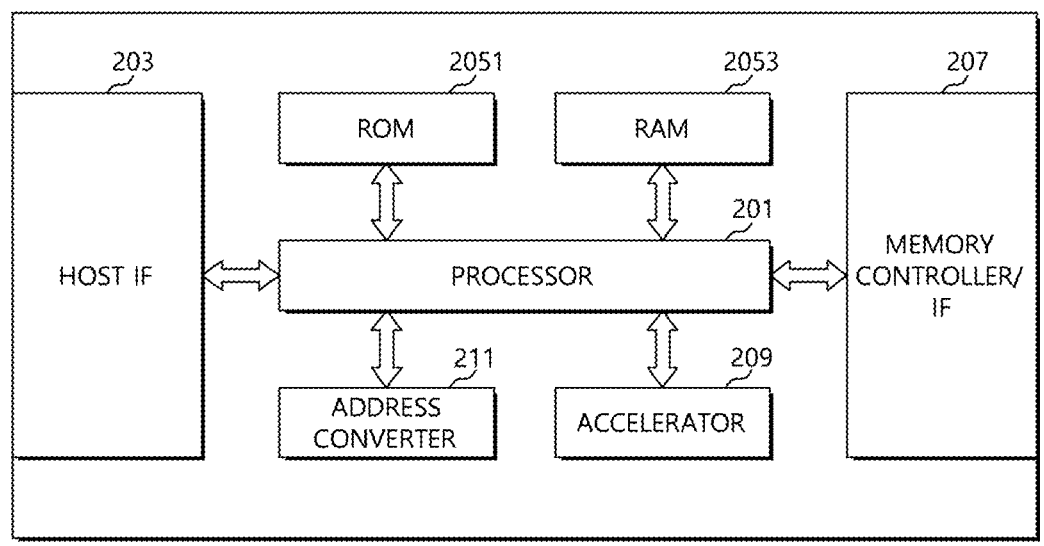
FIG. 2 illustrates a controller according to an embodiment of the present disclosure.

FIG. 2 is a diagram illustrating a configuration of a controller according to an embodiment.

Referring to FIG. 2, the controller 200 according to an embodiment may include a processor 201, a host interface 203, a read only memory (ROM) 2051, a random access memory (RAM) 2053, a memory controller/interface 207, an accelerator 209, and an address converter 211.

The processor 201 may control an overall operation of the memory device 300 and process an operation requested by the host 10 in response to a command transmitted from the host 10. To process the operation requested by the host 10, the processor 201 may use data provided from the host 10 or the memory device 300.

In an embodiment, the processor 201 may perform an operation for a specialized application executed in the electronic device 1. In an embodiment, the electronic device 1 may execute a machine learning application or an artificial intelligence application which requires a high bandwidth and the processor 201 may perform an operation specialized to the machine learning application or the artificial intelligence application.

The host interface 203 may provide interfacing between the host 10 and the data processing system 100. The host interface 203 may store a command received from the host 10, decode and schedule the command, and provide the decoded and scheduled command to the processor 201. The host interface 203 may provide data received from the host 10 to the processor 201 or the memory controller/interface 207 or provide data received from the memory device 300 through the memory controller/interface 207 to the host 10, according to control of the processor 201.

The memory controller/interface 207 may transmit data received from the host interface 203 or the processor 201 to the memory device 300 or receive data read out from the memory device 300 and provide the received data to the processor 201 or the host interface 203. To exchange signals, the memory controller/interface 207 may provide a communication channel for signal transmission and reception between the controller 200 and the memory device 300. The memory controller/interface 207 may provide a path through which the host 10 directly accesses the memory device 300 or accesses the memory device 300 through the controller 200.

Program codes, for example, firmware or software, required for an operation of the controller 200 may be stored in the ROM 2051 and code data and the like used by the program codes may be stored in the ROM 2051.

Data required for an operation of the controller 200 may be stored in the RAM 2053 and data generated by or at the direction of the controller 200 may be stored in the RAM 2053.

The host 10 may instruct the data processing system 100 to offload and process the operation processing for the specific application through the accelerator 209 of the controller 200 and the processor 201 may extract and decode the offload command to control the accelerator 209.

The accelerator 209 may process the operation according to the application program code loaded into the RAM 2053 in response to a command output from the processor 201. Data generated as an operation processing result of the accelerator 209 may be stored in a specific region of the memory 300 or may be transmitted to the host 10.

In an embodiment, the accelerator 209 may include an arithmetic logic unit (ALU) and a floating-point unit (FPU). The accelerator 209 may be selected among various types of accelerators, for example, a field-programmable gate array (FPGA), a massively parallel processor array (MPPA), a graphics processing unit (GPU), an application-specific integrated circuit (ASIC), a neural processing unit (NPU), a tensor processing unit (TPU), a multi-processor system-on-chip (MPSoC), and the like. In an embodiment, an accelerator 209 may be provided to correspond with each of the memory modules 300-1 to 300-N, or may be provided to correspond to a designated number of memory modules 300-1 to 300-x among the memory modules 300-1 to 300-N. The memory modules 300-1 to 3-N may input and output data in response to a command and an address from the accelerator 209.

Although not shown in FIG. 2, the accelerator 209 may include a command controller and a cache memory. When the accelerator 209 is an accelerator for a neural network operation, input data and weights to be operated upon, which are operation targets, and an operation result may be stored in the cache memory. In the neural network operation processing, the input data may be provided to the accelerator 209 from the host 10 and the weights may be stored in preset positions of the memory modules 300-1 to 300-N from the host 10. The accelerator 209 may read out the weights from the memory modules 300-1 to 300-N and perform an operation on the read weights and the input data, and the weights updated by the operation may be stored in their original positions of the memory module 300-1 to 300-N again and may be used in the following operation.

In an embodiment, to offload the operation processing for a specific application to the data processing system 100, the host 10 may transmit the control information CON including an application type of an operation to be offloaded and processed, a program code storage address of the application, an initial parameter storage address, and a parameter storage scheme.

The processor 201 may access the program code storage address to load the program code, for example, into the RAM 2053, and the accelerator 209 may execute the program code to perform operation processing and store the operation processing result in the memory device 300.

In an embodiment, the accelerator 209 may receive the plurality of pieces of input data having the input node IDs and the plurality of weight sets each including a plurality of weights, and generate the plurality of pieces of output data having the output node IDs by performing an operation on the plurality of pieces of input data and the plurality of weight sets.

The address converter 211 may receive a physical address PA of each weight set including the input node ID and the output node ID associated with the weight set in the operation processing, and store the weight set in a memory region corresponding to the memory address MA by mapping the physical address of the host 10 to the memory address MA in such a manner that the number of weights simultaneously (or within a limited period of time) read is maximized, for example, the maximum read bandwidth is guaranteed.

It has been illustrated in FIG. 2 that the address converter 211 is separated from the processor 201, but in an embodiment the address converter 211 may be included in the processor 201 so that the processor 201 may perform a function of the address converter 211.

The application of the operation requested to be offloaded and processed to the data processing system 100 by the host 10 may be a machine learning application requiring a high bandwidth and an application specialized for big data processing. Since the weights are stored by considering the weight reusing scheme of the neural network algorithm and the parameter storing scheme to write and read the data used for executing the applications in and from the memory device 300, the weights may be read using the maximum bandwidth of the memory device 300 and thus the latency of the operation may be minimized.

Figure 3:
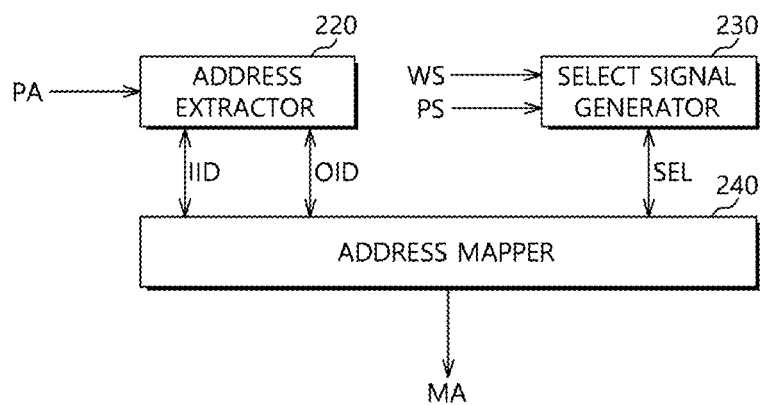
FIG. 3 illustrates an address converter according to an embodiment of the present disclosure.

FIG. 3 is a diagram illustrating a configuration of an address converter according to an embodiment.

Referring to FIG. 3, the address converter 211 may include an address extractor 220, a select signal generator 230, and an address mapper 240.

The address extractor 220 may extract the input node ID IID and the output node ID OID from the physical address PA provided from the host 10. In an embodiment, the physical address PA may be generated to include the input node ID indicating the input data operated with each weight set in the operation processing and the output node ID indicating the output data generated as the operation processing result, and the address extractor 220 may extract the input node ID IID and the output node ID OID from the physical address PA. The host 10 may generate a virtual address including the first physical address corresponding to the input node ID IID and the second physical address corresponding to the output node ID OID to extract the input node and the output node.

The select signal generator 230 may be configured to generate a select signal SEL based on a weight reusing scheme WS and a parameter storing scheme PS according to an application type included in the control information CON transmitted from the host 10.

The address mapper 240 may receive the input node ID IID and the output node ID OID and may be driven according to the select signal SEL to map the physical address PA to the memory address MA so that the number of weights simultaneously read (or read within a limited period of time) is maximized.

The memory address MA may include the first memory address corresponding to a memory division having the first latency in accessing with changing of an address and the second memory address corresponding to a memory division having the second latency shorter than the first latency in accessing with changing of an address. The address mapper 240 may map a physical address corresponding to an ID, which has the higher change frequency of the physical addresses of the plurality of weight sets used in the operation, to the second memory address. When data is read by accessing the memory address while changing the address, the memory address of a memory division having relatively fast access speed may be mapped to the physical address frequently changed and thus the read speed may be improved.

For example, with respect to the memory device 300 illustrated in FIG. 1, the host 10 may access a target position of the memory device 300 by generating the memory address including a plurality of addresses (e.g., bank group address, bank address, row address, and column address) respectively indicating each of the memory divisions (bank group, bank, row, and column) of the memory device 300. For example, a memory address may include a bank group address indicating a bank group, a bank address indicating a bank in the indicated bank group, a row address indicating a row in the indicated bank, and a column address indicating a column in the indicated row. When the host 10 accesses the memory device 300, the latency may be increased in order of: Latency priority 1: a case where the host 10 accesses a bank group different from a bank group previously accessed (i.e., at least the bank group address of the current memory address is different from the bank group address of the previous memory address), latency priority 2: a case where the host 10 accesses the same row in the same bank of the same bank group, Latency priority 3: a case where the host 10 accesses a different bank of the same bank group (i.e., the bank address of the current memory address is different from the bank address of the previous memory address, but the bank group addresses are the same), and Latency priority 4: a case where the host 10 accesses a different row in the same bank of the same bank group (the row address of the current memory address is different from the row address of the previous memory address, and the other parts of the two addresses are the same). The latency priority is listed in Table 1, below.

TABLE 1

| Latency priority | Bank Group | Bank | Row | Example AC parameter [ns] |
|---|---|---|---|---|
| 1 | different | — | — | tRRD_S or tCCD_S = 4 |
| 2 | same | same | same | tCCD_L = 6 |
| 3 | same | different | — | tRRD_L = 6, (tFAW) |
| 4 | same | same | different | tRC = 50 |

Accordingly, given a physical address PA comprising an input node ID IID and an output node ID OID, when the physical address PA is mapped to a memory address, the ID of the input node ID IID and the output node ID OID that has the higher change frequency may be mapped to the memory address in such a manner that the higher change frequency component of the physical address PA is mapped to an address of the shorter-latency memory division of the memory device with respect to a change in the address, and thus the time required to read the weights may be shortened.

Figure 4:
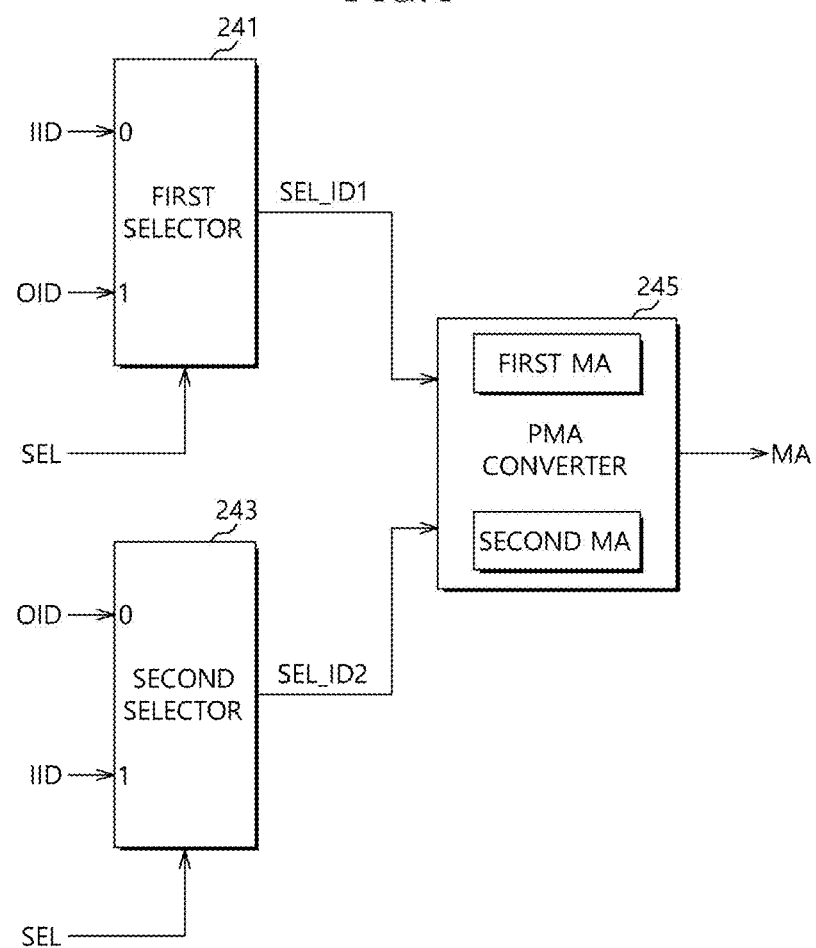
FIG. 4 illustrates an address mapper according to an embodiment of the present disclosure.

FIG. 4 is a diagram illustrating a configuration of an address mapper according to an embodiment.

Referring to FIG. 4, the address mapper 240 may include a first selector 241, a second selector 243, and a physical-memory address (PMA) converter 245.

The first selector 241 may receive the input node ID IID and the output node ID OID as input signals and may be driven in response to the select signal SEL to output one of the input signals IID and OID as a first physical select address SEL_ID1.

The second selector 243 may receive the input node ID IID and the output node ID OID as input signals and may be driven in response to the select signal SEL to output one of the input signals IID and OID as a second physical select address SEL_ID2. Accordingly, when the first selector 241 selects one of the IID and OID, the second selector 243 selects the other.

The PMA converter 245 may be configured to receive the first physical select address SEL_ID1 and the second physical select address SEL_ID2 and output a resultant memory address MA by mapping the first physical select address SEL_ID1 to a first memory address first MA and mapping the second physical select address SEL_ID2 to a second memory address second MA. Here, the first memory address first MA may be an address (for example, row address) of a memory division having the first latency in accessing with changing of an address. The second memory address second MA may be an address (for example, bank group address, bank address, and column address) of a memory division having the second latency shorter than the first latency in accessing with changing of an address.

When the select signal SEL is input, for example, in a logic high level, the output node ID OID input to the first selector 241 may be output as the first physical select address SEL_ID1 and the first physical select address SEL_ID1 may be mapped to the first memory address first MA. Also, the input node ID IID input to the second selector 243 may be output as the second physical select address SEL_ID2 and the second physical select address SEL_ID2 may be mapped to the second memory address second MA.

When the select signal SEL is input, for example, in a logic low level, the input node ID IID input to the first selector 241 may be output as the first physical select address SEL_ID1 and the first physical select address SEL_ID1 may be mapped to the first memory address first MA. Also, the output node ID OID input to the second selector 243 may be output as the second physical select address SEL_ID2 and the second physical select address SEL_ID2 may be mapped to the second memory address second MA.

Accordingly, in a case where any neural network operation is performed in the weight sharing manner or the input stationary manner, the change frequency of the output node ID may be high. In this case, the select signal SEL having a logic low level may be provided and the second physical select address SEL_ID2 of the second selector 243 which is the output node ID having the higher change frequency may be mapped to the second memory address second MA (for example, bank group address, back address, and column address). When the first physical select signal SEL_ID1 of the first selector 243 which is the input mode ID having the lower change frequency is mapped to the first memory address first MA (for example, row address), the change frequency of the first memory address first MA of which the latency is increased in address change may be minimized and thus read speed may be improved.

Figure 5:
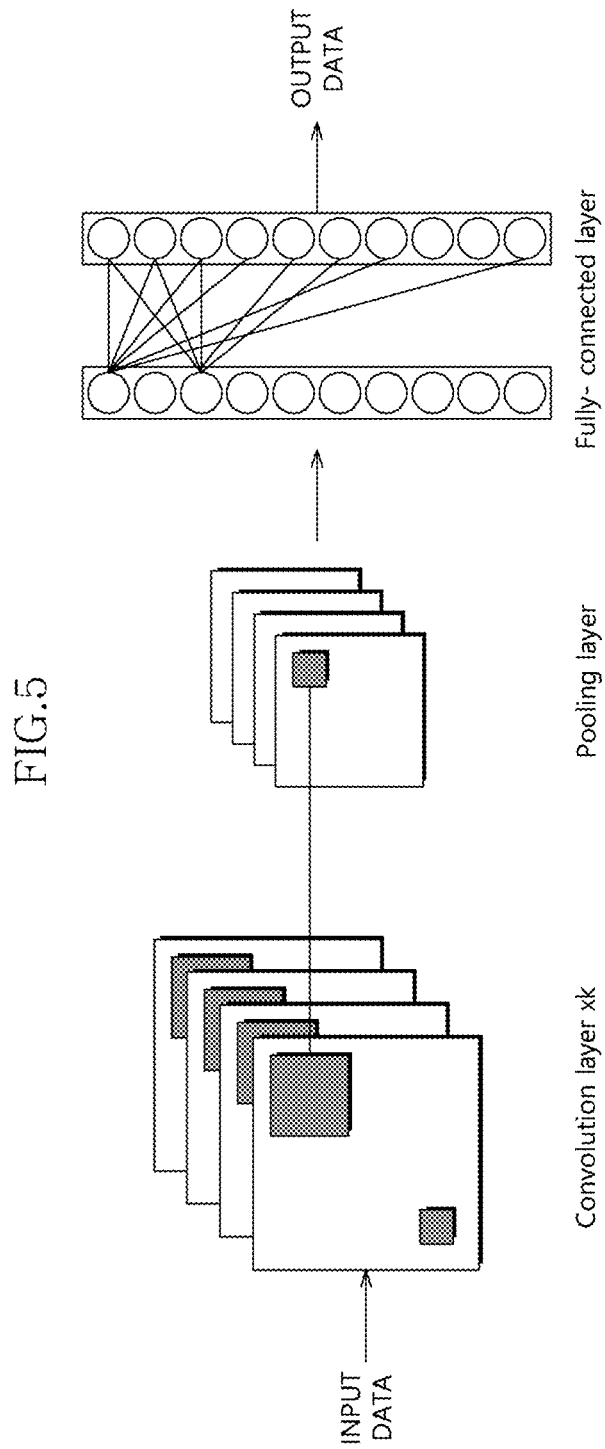
FIG. 5 illustrates a neural network model according to an embodiment of the present disclosure.

FIG. 5 is a diagram explaining a neural network model according to an embodiment.

FIG. 5 illustrates an example of a CNN model.

When recognizing an object, the human beings may recognize all or a part of the object having features rather than numerically understanding of values of pixel units. A CNN may be a structure in which such a mechanism is represented mathematically and may be used for two-dimensional data or 3D data such as image data. In general, a CNN may be configured as a convolution layer, a pooling layer, and a fully connected layer.

The convolution layer may be a layer for extracting characteristics of the input data and may be configured as a filter for extracting features, a stride which is an interval of the filter, and a padding for adjusting a size by filling a specific value.

Figure 6:
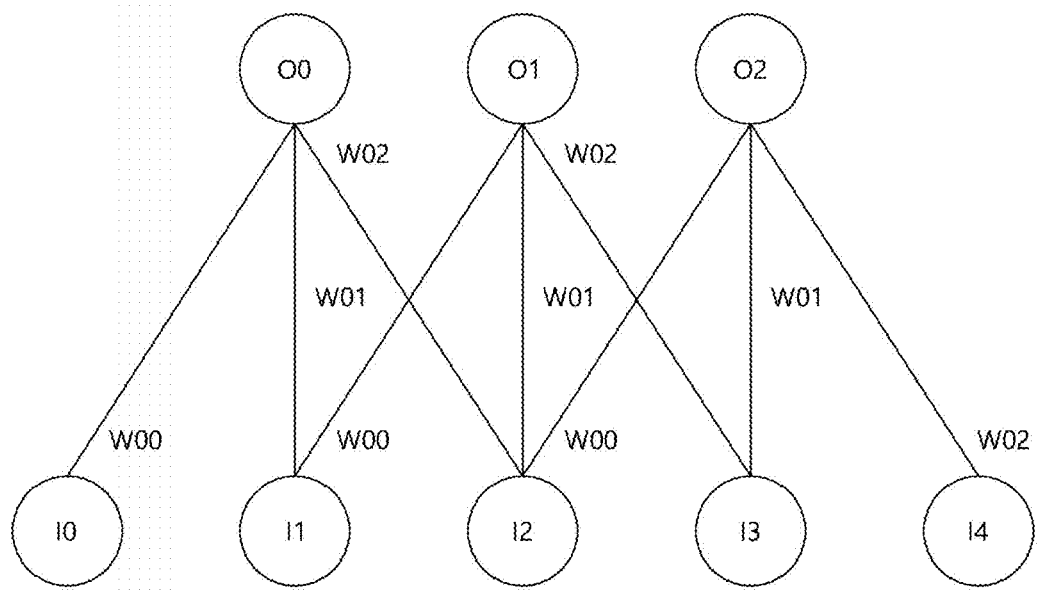
FIGS. 6 and 7 illustrate an operation concept of a convolution layer according to an embodiment of the present disclosure.
Figure 7:
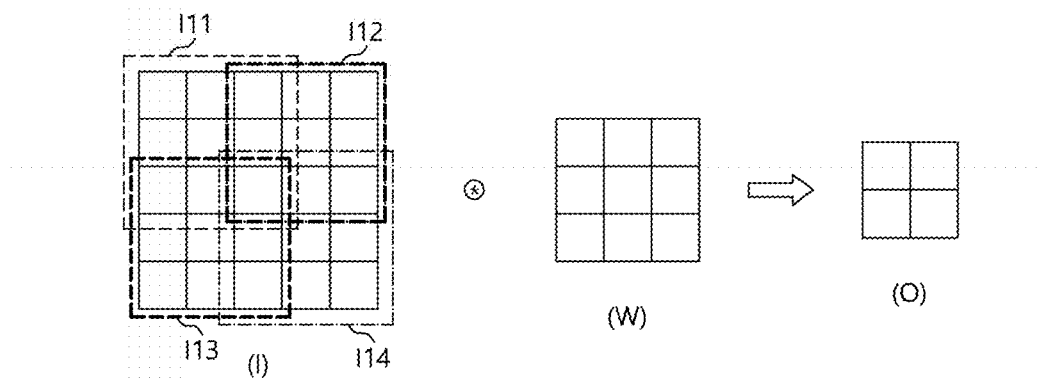

FIGS. 6 and 7 are diagrams explaining an operation concept of a convolution layer according to an embodiment.

Referring to FIG. 6, the convolution layer may be configured to generate output data O0 to O2 by applying a weight set {W00, W01, W02} as a filter to input data I0 to I4. The output data O0 to O2 may be represented in the following Equation 1. In each weight Wab of Equation, the number "a" represents the input node ID and the number "b" represents the output node ID.

$$O0=I0*W00+I1*W01+I2*W02$$

$$O1=I1*W00+I2*W01+I3*W01$$

$$O2=I2*W00+I3*W01+I4*W02 \qquad \text{Eqn. 1}$$

It can be seen from the output data O0 to O2 that the s weight set {W00, W01, W02} operated with the input data I0 to I4 may be shared.

In the convolution layer, the shared weights may be stationary in the accelerator 209 and thus the operation scheme may be referred to as the weight stationary scheme.

When an input data I is provided as illustrated in FIG. 7, an output data O may be generated by applying a filter W to partial input data I11 to I14 in a given stride (stride=2) (i.e., O0=I11·W, O1=I12·W, O2=I13·W, and O3=I14·W, where '·' represents a matrix inner product). It can be seen that when the filter W is applied to the is partial input data I11 to I14, for example, the weight set corresponding to W is shared.

Accordingly, when the weight sharing scheme is used as in the convolution layer, the mapping of the output node ID having the higher change frequency to the second memory address may be advantageous in a read speed aspect.

Returning to FIG. 5, the pooling layer may be a layer which adds spatial invariance to the features extracted through the convolution layer and serve to downscale the output of the convolution layer.

The convolution layer and the pooling layer which are parts of a CNN core may dramatically reduce the parameters of the neural network and thereby reduce the complexity of the entire model.

The fully connected layer may generate the output data by dividing the input data according to the feature extraction result output from the pooling layer.

Figure 8:
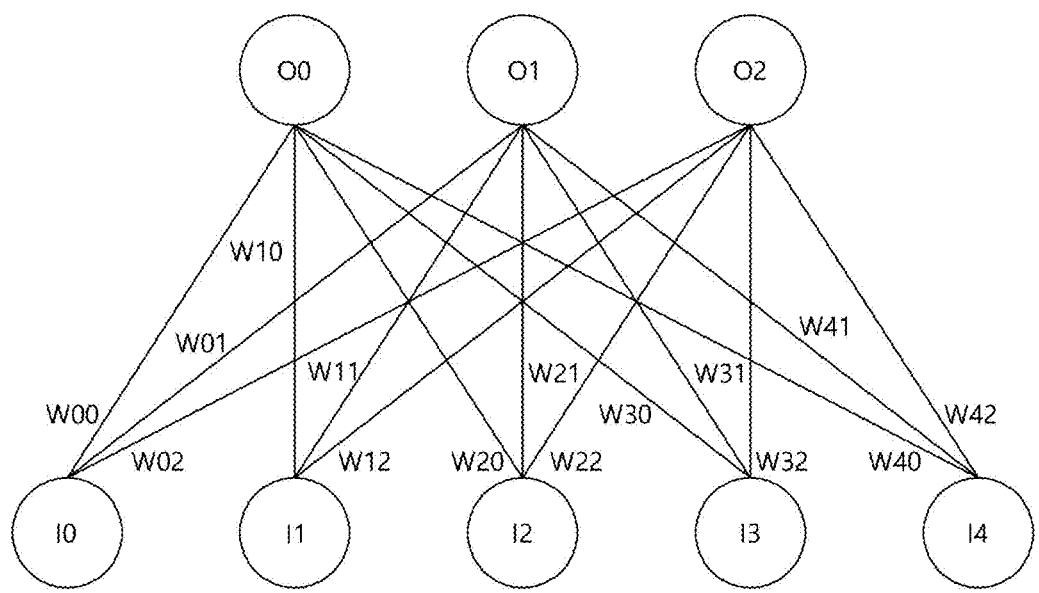
FIGS. 8 and 9 illustrate an operation concept of a fully connected layer according to an embodiment of the present disclosure.
Figure 9:
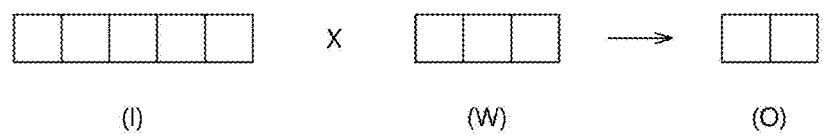

FIGS. 8 and 9 are diagrams explaining an operation concept of a fully connected layer according to an embodiment.

Referring to FIG. 8, the fully connected layer may be configured to generate output data O0 to O2 by multiplying different weight sets {W00, W10, W20, W30, W40}, {W01 W11, W21, W31, W41}, and {W02, W12, W22, W32, W42} with respect to input data I0 to I4. The output data O0 to O2 may be represented by Equation 2, below. In each weight Wab of Equation 2, the number "a" represents the input node ID and the number "b" represents the output node ID.

$$O0=I0*W00+I1*W10+I2*W20+I3*W30+I4*W40$$

$$O1=I0*W01+I1*W11+I2*W21+I3*W31+I4*W41$$

$$O2=I0*W02+I1*W12+I2*W22+I3*W32+I4*W42 \qquad \text{Eqn. 2}$$

It can be seen from the output data that the weight sets operated with the input data I0 to I4 are not shared.

When an input data I is provided as illustrated in FIG. 9, an output data O may be generated by applying the weight W to the input data I. The input data I may be an active node of a previous layer and the output data O may be obtained by performing a matrix product on the input data I and the weight W.

When the input stationary scheme is used in the operation process of the fully connected layer, for example, when the operation is performed by changing the weight while the input data I0 to I4 are stationary in the accelerator 209, it can be seen that the change frequency of the output node ID of the weight is high as in Equation 3, below. Accordingly, when the weight is not shared as in the fully connected layer and the input stationary scheme is used, the mapping of the output node ID having the higher change frequency to the second memory address may be advantageous from a read speed aspect.

$$\begin{aligned} O0 &= I0*W00 +I1*W10 + \\ O1 &= I0*W01 +I1*W11 + \\ O2 &= I0*W02 +I1*W12 + \end{aligned} \qquad \text{Eqn. 3}$$

$$\begin{aligned} &I2*W20 +I3*W30 +I4*W40 \\ &I2*W21 +I3*W31 +I4*W41 \\ &I2*W22 +I3*W32 +I4*W42 \end{aligned}$$

It can be seen that when the output stationary scheme is used, the change frequency of the input node ID is high.

$$O0 = I0*W00 + I1*W10 + I2*W20 + I3*W30 + I4*W40 \qquad \text{Eqn. 4}$$

$$O1 = I0*W01 + I1*W11 + I2*W21 + I3*W31 + I4*W41$$

-continued $$O2 = \boxed{I0*W02 + I1*W12 + I2*W22 + I3*W32 + I4*W42}$$

Accordingly, when the weight is not shared as in the fully connected layer and the output stationary scheme is used, the mapping of the input node ID having the higher change frequency, as shown by the boxes in FIG. 4, above, to the second memory address may be advantageous from a read speed aspect.

Figures 10, 11:
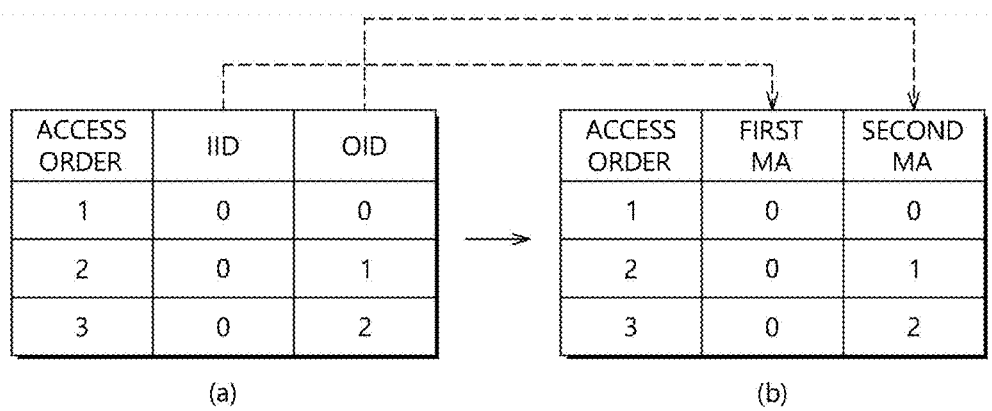

FIG. 10 is a diagram explaining a select signal generation method according to an embodiment.

Referring to FIGS. 3, 4, and 10, the select signal generator 230 may generate the select signal SEL based on the weight reusing scheme WS and the parameter storing scheme PS. For example, when the weight reusing scheme (the weight sharing scheme) WS is used (WS=H), the select signal generator 230 may generate the select signal SEL of a logic low level regardless of the parameter storing scheme PS.

In a case where the weight reusing scheme is not used (WS=L), for example, in a case where the weight non-sharing scheme is used (WS=L), the select signal generator 230 may generate the select signal SEL of a logic low level when the parameter storing scheme is the input stationary scheme (PS=H) and generate the select signal SEL of a logic high level when the parameter storing scheme is the output stationary scheme (PS=L).

Accordingly, when the select signal SEL is the logic low level, for example, when the weight reusing scheme or the input stationary scheme is used, the address mapper 240 may map the input node ID IID having the lower change frequency to the first memory address (e.g. row address), and map the output node ID OID to the second memory address (e.g., bank group and/or bank address and/or column address). When the select signal SEL is the logic high level, for example, when the weight reusing scheme is not used and the parameter storing scheme is the output stationary scheme, the address mapper 240 may map the output node ID OID having the lower change frequency to the first memory address (row address) and map the input node ID IID to the second memory address (e.g., bank group and/or bank address and/or column address).

Figure 12:
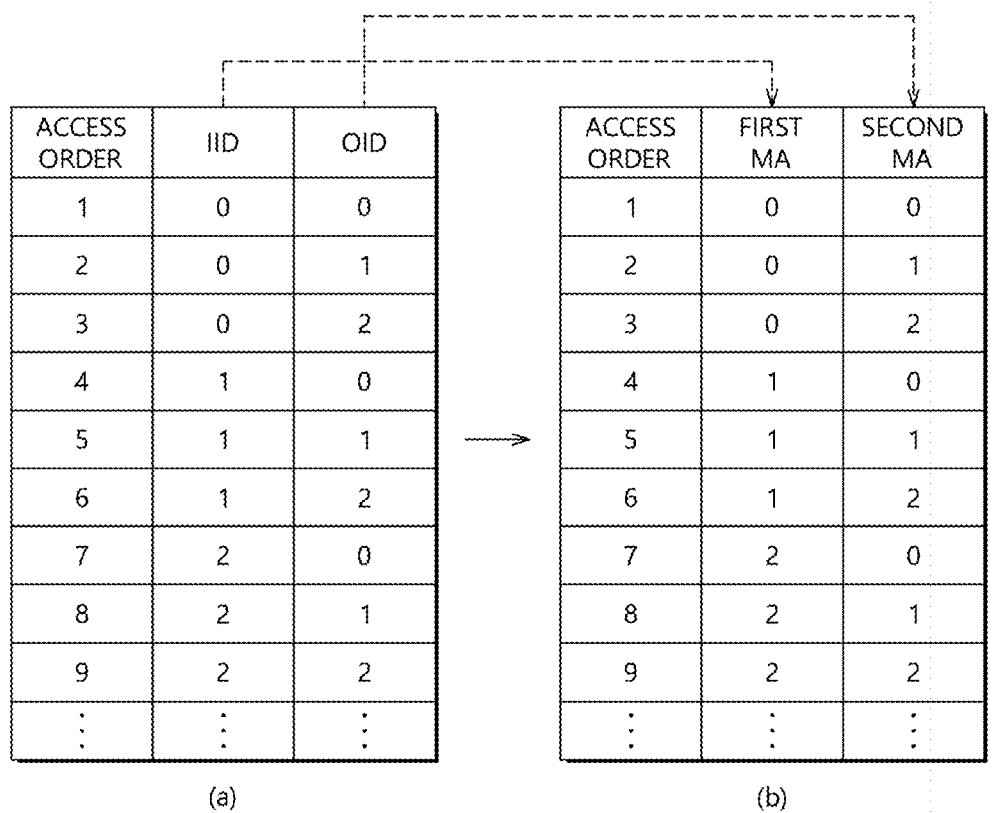

FIGS. 11 to 13 are diagrams explaining address mapping concepts according to embodiments.

FIG. 11 includes tables (a) and (b) that illustrate a mapping concept of the input node ID IID and the output node ID OID for a neural network operation of the weight reusing scheme.

When each weight set is indexed by the input node ID IID and the output node ID OID as illustrated in FIG. 11(a), to perform the neural network operation in the weight reusing manner, the input node ID IID may be mapped to the first memory address first MA having the first latency in accessing with changing of an address (for example, the row address) and the output node ID OID may be mapped to the second memory address second MA having the second latency shorter than the first latency in accessing with changing of an address (for example, the bank group address), as illustrated in FIG. 11(b). For example, in the case shown in FIG. 11, if a memory device includes four bank groups each including four banks, then when the number of input node IDs IIDs is four or less and the number of output node IDs OIDs is four or less, the second MA to which the OIDs are mapped may correspond to a bank group address and the first MA to which the IIDs are mapped may correspond to a bank address. But if there are five to sixteen output nodes, the second MA to which the OIDs are mapped may correspond to a combination of the bank group address and the bank address, and the first MA to which the IIDs are mapped may correspond to the row address. However, embodiments are not limited to these examples.

FIG. 12 includes tables (a) and (b) that illustrate an address mapping concept in a case where the weight is not reused and the operation is performed in the input stationary manner. Because the output node ID OID has the higher change frequency in this case, the same mapping method as that of FIG. 11 tables (a) and (b) may be applied.

FIG. 13 includes tables (a) and (b) that illustrate an address mapping concept in a case where the weight is not reused and the operation is performed in the output stationary manner, wherein the input node ID IID has the higher change frequency.

When the weight set is indexed by the input node ID IID and the output node ID OID as illustrated in FIG. 13(a), the input node ID IID may be mapped to the second memory address second MA having the second latency when accessing with a change of an address and the output node ID OID may be mapped to the first memory address first MA having the first latency longer than the second latency in accessing with a change of an address, as illustrated in FIG. 13(b). For example, in the case shown in FIG. 13, if a memory device includes four bank groups each including four banks, then when the number of input node IDs IIDs is four or less and the number of output node IDs OIDs is four or less, the second MA to which the IIDs are mapped may correspond to a bank group address and the first MA to which the OIDs are mapped may correspond to a bank address. But if there are five to sixteen input nodes, the second MA to which the IIDs are mapped may correspond to a combination of bank group address and the bank address, and the first MA to which the OIDs are mapped may correspond to the row address. However, embodiments are not limited to these examples.

The artificial intelligence may be a field which studies a method for imitating intellectual abilities of the human beings and have a direct and indirect effect on various fields including a computer science and a semiconductor field.

According to recent active research results of artificial neural network algorithms and machine learning, the accuracy of image recognition, natural language processing, and the like has been improved to the human level. The artificial intelligence technology having high accuracy may be expected to be realized even in various fields of autonomous vehicles, automation systems, and the like in the future.

In processing of the artificial intelligence algorithm, power efficiency of the data processing system 100 may be increased by reading weights repeatedly used in an operation process at a high speed as in the present technology.

Figure 14:
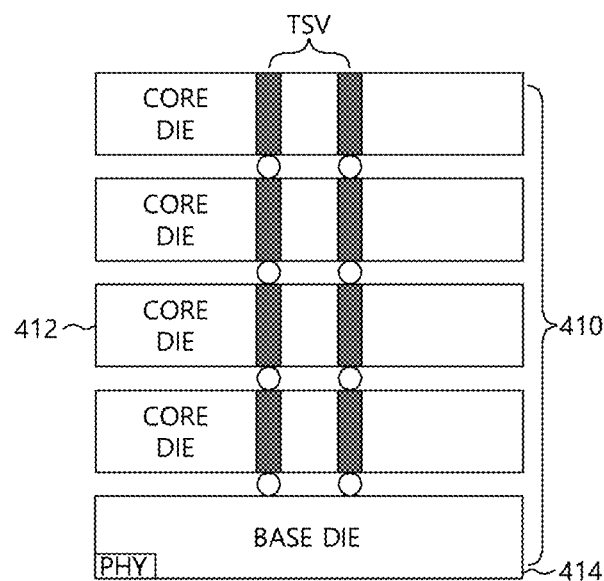
FIGS. 14, 15, and 16 illustrate stacked semiconductor apparatuses in accordance with embodiments.
Figure 15:
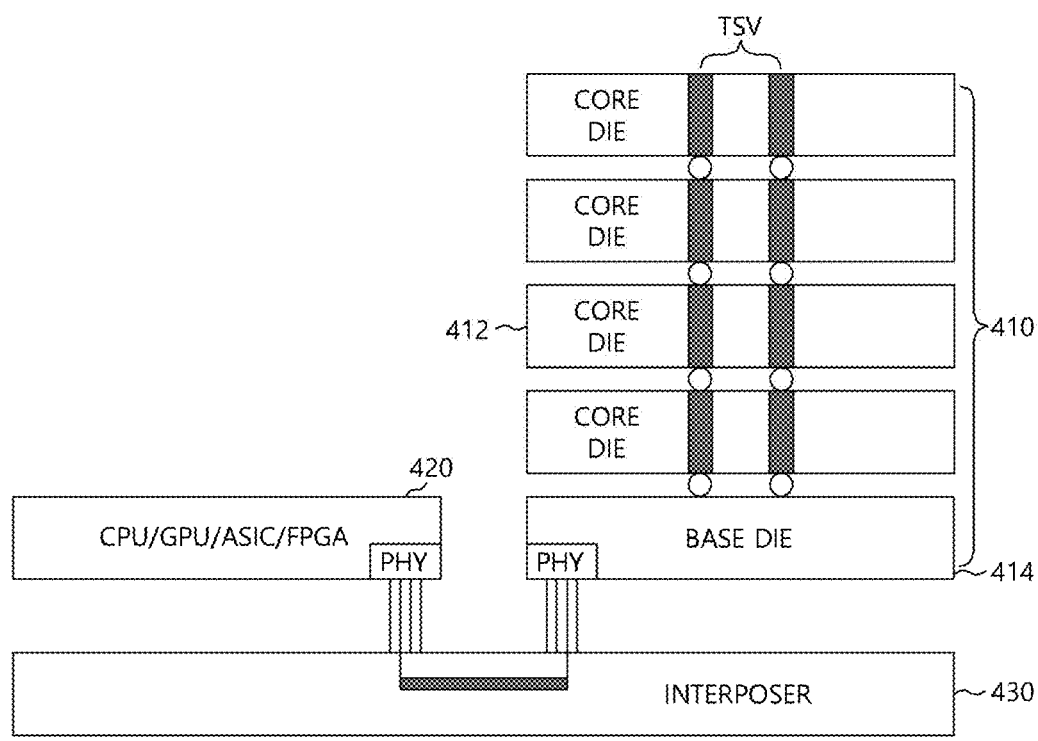
Figure 16:
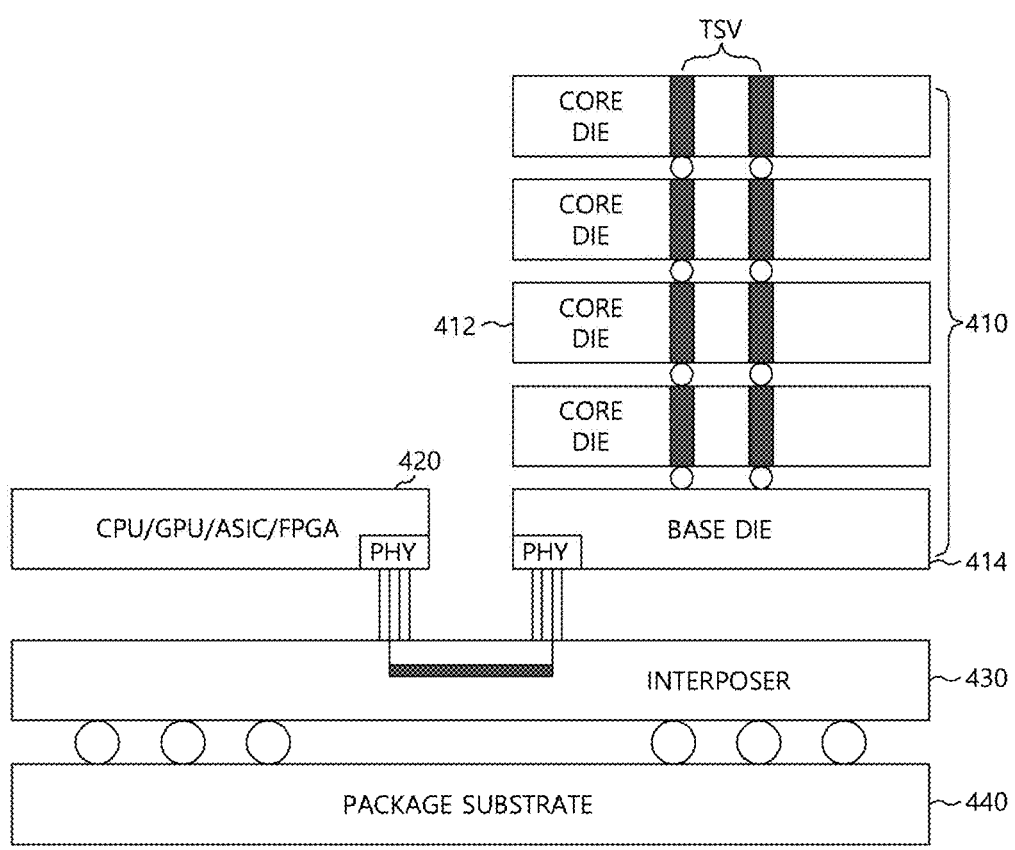

FIGS. 14 to 16 illustrate stacked semiconductor apparatuses in accordance with embodiments.

FIG. 14 illustrates a stacked semiconductor apparatus 40 in accordance with an embodiment.

The stacked semiconductor apparatus 40 may include a stack structure 410 in which a plurality of dies are stacked. The stack structure 410 may be configured in a high bandwidth memory (HBM) type in which the plurality of dies are stacked and electrically connected to one another via through-silicon vias (TSV), so that the number of input/output units is increased and thus a bandwidth is increased.

The stack structure 410 may include a base die 414 and a plurality of core dies 412.

The plurality of core dies 412 may be stacked on the base die 414 and electrically connected to one another via the through-silicon vias (TSV). In each of the core dies 412, memory cells for storing data and circuits for core operations of the memory cells may be disposed.

The core dies 412 may be electrically connected to the base die 414 via the through-silicon vias (TSV) and receive signals, power and the like from the base die 414 via the through-silicon vias (TSV).

The base die 414, for example, may include the controller 300 and the memory apparatus 200 illustrated in FIGS. 1 to 3. The base die 414 may perform various functions in the stacked semiconductor apparatus 40, for example, memory management functions such as power management and refresh of the memory cells or timing adjustment functions between the core dies 412 and the base die 414.

A physical interface area PHY included in the base die 414 may be an input/output area of an address, a command, data, a control signal and the like. The physical interface area PHY may be provided with a predetermined number of input/output circuits capable of satisfying a data processing speed required for the stacked semiconductor apparatus 40. A plurality of input/output terminals and a power supply terminal may be provided in the physical interface area PHY on the rear surface of the base die 414 to receive signals and power required for an input/output operation.

FIG. 15 illustrates a stacked semiconductor apparatus 400 in accordance with an embodiment.

The stacked semiconductor apparatus 400 may include a stack structure 410 of a plurality of core dies 412 and a base die 414, a memory host 420, and an interface substrate 430. The memory host 420 may be a CPU, a GPU, an application specific integrated circuit (ASIC), a field programmable gate arrays (FPGA) and the like.

The base die 414 may be provided with a circuit for an interface between the core dies 412 and the memory host 420. The stack structure 410 may have a structure similar to that described with reference to FIG. 14.

A physical interface area PHY of the stack structure 410 and a physical interface area PHY of the memory host 420 may be electrically connected to each other through the interface substrate 430. The interface substrate 430 may be referred to as an interposer.

FIG. 16 illustrates a stacked semiconductor apparatus 4000 in accordance with an embodiment.

It may be understood that the stacked semiconductor apparatus 4000 illustrated in FIG. 16 is obtained by disposing the stacked semiconductor apparatus 400 illustrated in FIG. 15 on a package substrate 440.

The package substrate 440 and the interface substrate 430 may be electrically connected to each other through connection terminals.

A system in package (SiP) type semiconductor apparatus may be implemented by staking the stack structure 410 and the memory host 420, which are illustrated in FIG. 15, on the interface substrate 430 and mounting them on the package substrate 440 for the purpose of package.

Figure 17:
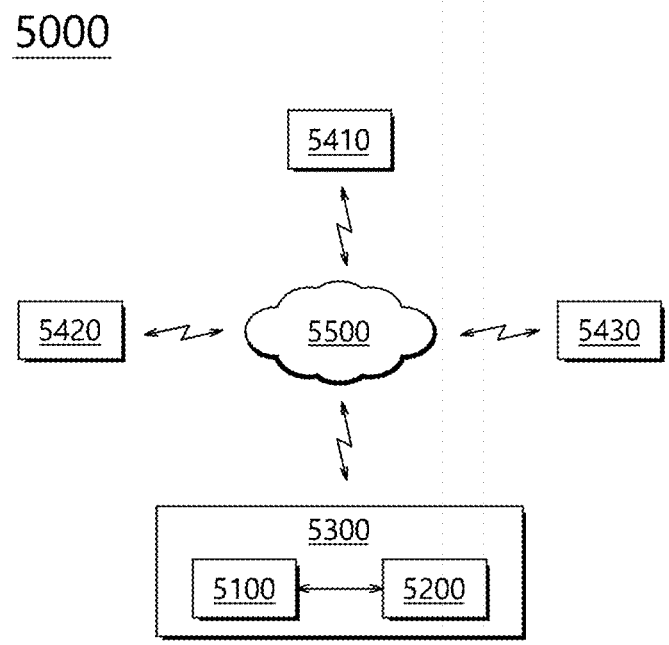
FIG. 17 illustrates a network system including a data storage device in accordance with an embodiment.

FIG. 17 is a diagram illustrating a network system 5000 including a data storage device, in accordance with an embodiment. Referring to FIG. 17, the network system 5000 may include a server system 5300 and a plurality of client systems 5410, 5420, and 5430, which are coupled through a network 5500.

The server system 5300 may service data in response to requests from the plurality of client systems 5410 to 5430. For example, the server system 5300 may store the data provided by the plurality of client systems 5410 to 5430. For another example, the server system 5300 may provide data to the plurality of client systems 5410 to 5430.

The server system 5300 may include a host device 5100 and a memory system 5200. The memory system 5200 may include one or more of the data processing system 100 shown in FIG. 1, the stacked semiconductor apparatuses 40 shown in FIG. 14, the stacked semiconductor apparatus 400 shown in FIG. 15, or the stacked semiconductor apparatus 4000 shown in FIG. 16, or combinations thereof.

While various embodiments have been described above, it will be understood to those skilled in the art that the embodiments described are examples only. Accordingly, the data processing system and the operating method thereof described herein should not be limited based on the described embodiments.

The above described embodiments of the present invention are intended to illustrate and not to limit the present invention. Various alternatives and equivalents are possible. The invention is not limited by the embodiments described herein. Nor is the invention limited to any specific type of semiconductor device. Other additions, subtractions, or modifications are obvious in view of the present disclosure and are intended to fall within the scope of the appended claims.

What is claimed is:

1. A data processing system, that performs a neural network operation in response to a request from a host, comprising:
   a controller configured to receive control information and input data from the host and to generate output data by performing an operation on the input data and a weight, the control information including a scheme for storing a parameter including the input data, the output data, and the weight and a scheme for reusing the weight; and
   a memory device configured to store the weight according to control of the controller as the weight is transmitted from the host,
   wherein the controller includes an address converter configured to map a physical address provided from the host to a memory address based on the parameter storing scheme and the weight reusing scheme so that a bandwidth of a reading operation of the weight is maximized.

2. The data processing system of claim 1, wherein the physical address includes an input node identifier (ID) indicating the input data operated on by the weight and an output node ID indicating the output data generated using the weight.

3. The data processing system of claim 2, wherein the neural network operation is performed using the weight reusing scheme, the address converter is configured to map the input node ID to a first memory address corresponding to a memory division having a first latency in accessing with changing of an address and map the output node ID to a second memory address corresponding to a memory division having a second latency shorter than the first latency in accessing with changing of an address.

4. The data processing system of claim 3, wherein the neural network operation performed using the weight reuse scheme is a convolution layer operation of a convolutional neural network (CNN).

5. The data processing system of claim 2, wherein the neural network operation is performed not in the weight reusing scheme but in an input stationary scheme of the parameter storing scheme, the address converter is configured to map the output node ID to a second memory address corresponding to a memory division having a second latency in accessing with changing of an address and map the input node ID to a first memory address corresponding to a memory division having a first latency longer than the second latency in accessing with changing of an address.

6. The data processing system of claim 2, wherein the neural network operation is performed not in the weight reusing scheme but in an output stationary scheme of the parameter storing scheme, the address converter is configured to map the input node ID to a second memory address corresponding to a memory division having a second latency in accessing with changing of an address and map the output node ID to a first memory address corresponding to a memory division having a first latency longer than the second latency in accessing with changing of an address.

7. The data processing system of claim 6, wherein the neural network operation non-reusing the weight is a fully connected neural network operation or a fully connected layer operation of a convolutional neural network (CNN).

8. A data processing system, that performs a neural network operation in response to a request of a host, comprising:
a controller configured to generate output data by performing an operation on using input data and a weight transmitted from the host; and
a memory device configured to store the weight transmitted from the host according to control of the controller,
wherein the controller includes an address converter configured to receive a physical address, the physical address including an input node identifier (ID) indicating the input data and an output node ID indicating the output data, from the host as a weight storage address and map the physical address to a memory address according to a change pattern of input node IDs and output node IDs of a plurality of weights used in the operation.

9. The data processing system of claim 8, wherein the physical address includes a first physical address corresponding to the input node ID and a second physical address corresponding to the output node ID,
the memory address includes a first memory address corresponding to a memory division having a first latency in accessing with changing of an address and a second memory address corresponding to a memory division having a second latency shorter than the first latency in accessing with changing of an address, and
the address converter is configured to map a physical address having the higher change frequency of the first and second physical addresses of the plurality of weights used in the operation to the second memory address.

10. The data processing system of claim 8, wherein the physical address includes a first physical address corresponding to the input node ID and a second physical address corresponding to the output node ID, and
wherein the address converter includes:
an address extractor configured to extract the first physical address corresponding to the input node ID and the second physical address corresponding to the output node ID from the physical address;
a select signal generator configured to generate a select signal by receiving control information from the host, the control information including a scheme for storing a parameter including the input data, the output data, and the weight and a scheme for reusing the weight; and
an address mapper configured to map the first physical address and the second physical address to the memory address in response to the select signal.

11. The data processing system of claim 10, wherein the memory address includes a first memory address corresponding to a memory division having a first latency in accessing with changing of an address and a second memory address corresponding to a memory division having a second latency shorter than the first latency in accessing with changing of an address, and
the address mapper is configured to map a physical address that has the higher change frequency of the first and second physical addresses of the plurality of weights used in the operation to the second memory address.

12. The data processing system of claim 11, wherein when the neural network operation is performed in the weight reusing scheme, the address mapper is configured to map the input node ID to the first memory address and map the output node ID to the second memory address.

13. The data processing system of claim 11, wherein when the neural network operation is performed not in the weight reusing scheme but in an input stationary scheme of the parameter storing scheme, the address mapper is configured to map the output node ID to the second memory address and map the input node ID to the first memory address.

14. The data processing system of claim 11, wherein when the neural network operation is performed not in the weight reusing scheme but in an output stationary scheme of the parameter storing scheme, the address mapper is configured to map the input node ID to the second memory address and map the output node ID to the first memory address.

15. An operating method of a data processing system that includes a controller and a memory device configured to store data according to control of the controller and that performs a neutral network operation in response to a request of a host, the method comprising:
mapping, by the controller as control information, input data, and a weight are received from the host, the control information including a scheme for storing a parameter including the input data, output data, and the weight and a scheme for reusing the weight, a physical address provided from the host to a memory address based on the parameter storing scheme and the weight reusing scheme so that a bandwidth of a reading operation of the weight is maximized;
storing, by the memory device, the weight in the memory address; and
generating, by the controller, the output data by performing an operation on the input data and the weight.

16. The method of claim 15, wherein the physical address includes an input node identifier (ID) indicating the input data operated with the weight and an output node ID indicating the output data generated using the weight.

17. The method of claim 16, wherein mapping the physical address includes: when the neural network operation is performed in the weight reusing scheme, mapping the input node ID to a second memory address corresponding to a memory division having a second latency in accessing with changing of an address and mapping the output node ID to a first memory address corresponding to a memory division having a first latency longer than the second latency in accessing with changing of an address.

18. The method of claim 16, wherein mapping the physical address includes: when the neural network operation is performed not in the weight reusing scheme but in an input stationary scheme of the parameter storing scheme, mapping the output node ID to a second memory address corresponding to a memory division having a second latency in accessing with changing of an address and mapping the input node ID to a first memory address corresponding to a memory division having a first latency longer than the second latency in accessing with changing of an address.

19. The method of claim 16, wherein mapping the physical address includes: when the neural network operation is performed not in the weight reusing scheme but in an output stationary scheme of the parameter storing scheme, mapping the input node ID to a second memory address corresponding to a memory division having a second latency in accessing with changing of an address and mapping the output node ID to a first memory address corresponding to a memory division having a first latency longer than the second latency in accessing with changing of an address.

* * * * *